(12) United States Patent
Monte

(10) Patent No.: US 7,567,394 B1
(45) Date of Patent: Jul. 28, 2009

(54) DISPLAY SCREEN MAGNIFYING DEVICE

(76) Inventor: Alan S. Monte, 2537 W. La., Phoenix, AZ (US) 85015

( * ) Notice: Subject to any disclaimer, the term of this patent is extended or adjusted under 35 U.S.C. 154(b) by 0 days.

(21) Appl. No.: 11/986,742

(22) Filed: Nov. 26, 2007

Related U.S. Application Data

(60) Provisional application No. 60/872,855, filed on Dec. 5, 2006.

(51) Int. Cl.
*G02B 3/00* (2006.01)
*G02B 27/02* (2006.01)

(52) U.S. Cl. ................... 359/810; 359/802; 359/809

(58) Field of Classification Search ......... 359/802–811, 359/819
See application file for complete search history.

(56) References Cited

U.S. PATENT DOCUMENTS

| 5,748,375 | A | * | 5/1998 | Yamana | 359/622 |
| 6,067,459 | A | * | 5/2000 | Lincoln et al. | 455/566 |
| 6,084,962 | A | | 7/2000 | Plenge | 379/433 |
| 6,275,333 | B1 | * | 8/2001 | Shaffer | 359/440 |

* cited by examiner

*Primary Examiner*—Mohammed Hasan
(74) *Attorney, Agent, or Firm*—Harpman & Harpman

(57) ABSTRACT

A magnification device for a display screen of an electronic device that can be selectively sized to fit directly thereon. The magnification device is of a thin, flexible synthetic resin sheet having distributed magnification and static adhesion properties that can easily be cut to size to fit the display screen venue to be magnified.

2 Claims, 2 Drawing Sheets

US 7,567,394 B1

DISPLAY SCREEN MAGNIFYING DEVICE

This application claims benefit of U.S. Provisional Application No. 60/872,855, filed on Dec. 5, 2006.

BACKGROUND OF THE INVENTION

1. Technical Field

This invention relates generally to a display screen magnifying device and more particularly the invention relates to a display screen magnifying device which fits over the display screen of a cellular telephone magnifying the display screen.

2. Description of Prior Art

Prior art magnification devices for use primarily on cell phones which in addition to serving as a practical means of communication while on the go, technological advantages have evolved cellular telephones into mini computers. These devices are capable of keeping consumers abreast of the latest stock market quotes, providing wireless internet access and delivering local weather updates and have become practically indispensable to millions the world over.

As technology changes on virtually a daily basis, cellular telephones are continuously evolving to incorporate new features to make these devices even more convenient for the consumer. Whether one wants a phone that can take pictures or allow for hands free usage or both, there is certain to be a model readily available for that user. One of the effective results from the advancement of cellular technology is that the display screens have gotten smaller and unfortunately this can prove quite a challenge for consumers who suffer from some form of vision impairment. Whether needing to see who is calling via caller I.D. or wanting to check e-mail through the phone, the user is typically required to use spectacles or even corrective lenses and still have difficulty seeing the information on the screen.

A number of prior art magnification devices have been developed for such applications, see for example U.S. Pat. Nos. 6,007,459, 6,084,962 and 6,275,333.

In U.S. Pat. No. 6,007,459 a displayed magnifier can be seen of a magnifying lens is positioned in a holder that can be attached over a display to be magnified.

U.S. Pat. No. 6,084,962 is directed to a display window for a handset in which a radio telephone has a display window on which information indicia is displayed.

Finally, in U.S. Pat. No. 6,275,333 claims a magnification device for a display window of an electronic communication device. Multiple magnification inserts are provided for a mounting frame which is positioned on the device by ancillary means allowing selective magnification determination by replacing the magnification insert.

SUMMARY OF THE INVENTION

A size configurable magnification device for viewing of information display screens of electronic devices such as cell phones. The magnification device is formed of a flexible synthetic resin sheet material having magnification properties formed therewithin. Selective size application is achieved by cutting to custom dimensions of the display to be covered by the device under static attraction thereto.

DETAILED DESCRIPTION OF THE INVENTION

Figure 1:
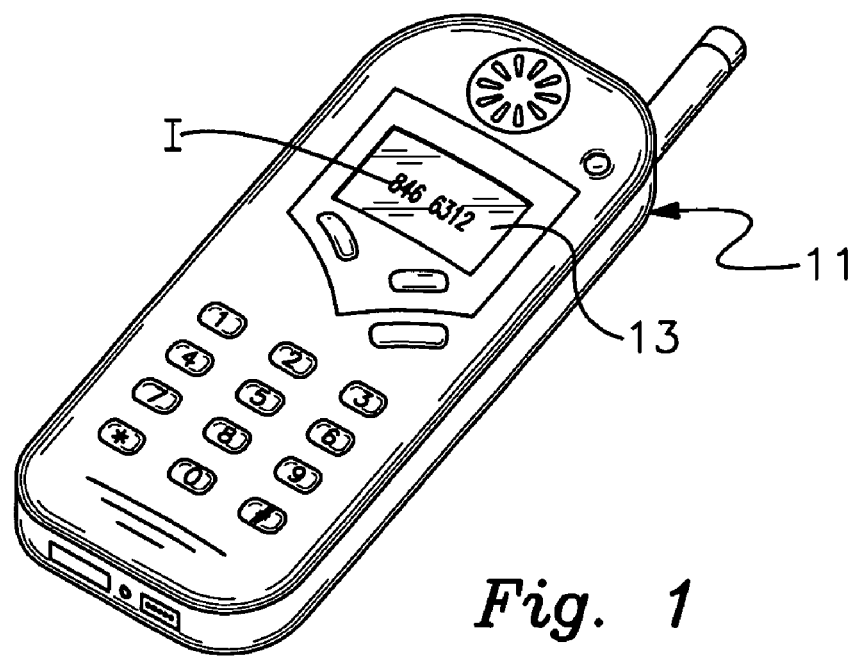
FIG. 1 is a perspective view illustrating a standard cellular telephone with a display screen.
Figure 2:
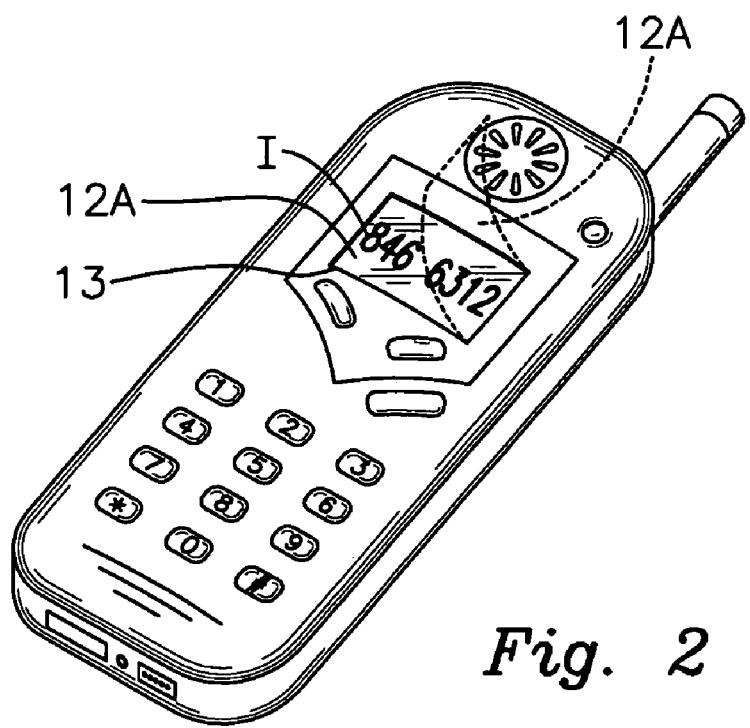
FIG. 2 is a perspective view illustrating a display screen magnification device of the invention positioned on the cellular telephone display screen.
Figure 3:
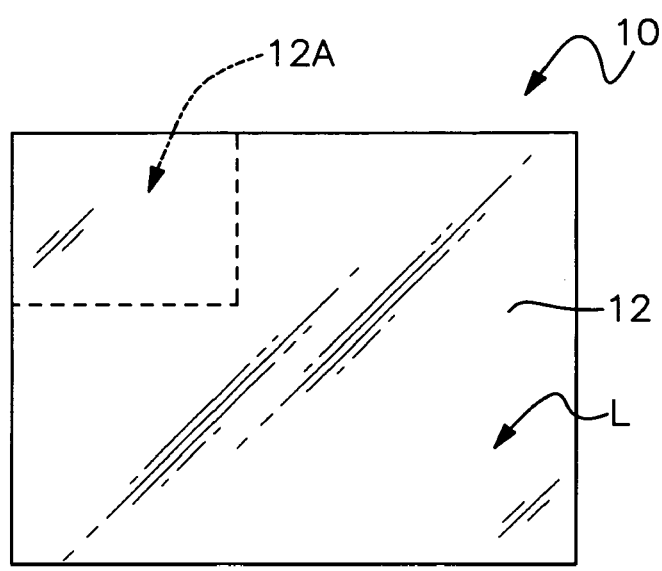
FIG. 3 is a side elevational view of the magnifying device of the invention.
Figure 4:
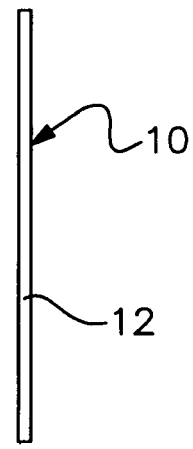
FIG. 4 is an end view thereof.

Referring now to FIG. 3 of the drawings, the present invention is directed towards a display screen magnifying device 10 for magnifying a display screen 13 of a cellular telephone 11. Basically, the display screen magnifying device 10 is of a translucent magnifying strip 12 which is sized and shaped to fit over the display screen 13 as seen in FIG. 2 of the drawings.

Preferably, the strip 12 is substantially rectangular in shape measuring approximately, in this example, four inches in length and three inches in width. While the strip 12 has been described as being substantially rectangular in shape and having particular dimensions, it is within the scope of the present invention for the strip 12 to have other sizes and shapes.

The strip 12 of the display screen magnifying device 10 of the invention is preferably constructed from a clear synthetic resin film having electrostatic capabilities to facilitate a seamless fit over any surface. Providing the magnifying component, each strip 12 is infused with enlarged aspheric lightweight lensing L with a protective Cera-tec coating. The magnification strips can be layered providing two times (2×) with one layer, four times (4×) with two layers or six times (6×) with three layers in order to accommodate varying levels of visual impairment.

In use, the display screen magnifying device 10 of the invention is very simple and straightforward. First the user (not shown) removes a strip 12 from its packaging (not shown) and holds the strip over the cellular telephone display screen 13 to gauge the coverage. The strip 12 is cut to size using scissors (not shown) so that it fits a particular display screen 13 size as indicated in broken lines at 12A. Next the user simply places the shaped lens 12A on the display screen 13 pressing downwardly so the static cling forms complete coverage of the viewing area of the display screen 13. As a result the user need only glance at the display screen 13 to see the display information I clearly and accurately without pause as illustrated in FIG. 2 of the drawings. The numbers and words on the screen are enlarged so that the eye easily can see them and the lens strip 12A works to expand the size of even the smallest of fonts. If desired, the strip 12A can easily be pulled away from the cellular telephone 11 and put aside until needed again.

There are several significant benefits and advantages associated with the display screen magnifying device 10 of the present invention. Foremost, the display screen magnifying device 10 offers visual impaired consumers a simple and effective means of enhancing the display screen 13 on their cellular telephones 11. A line of electrostatic film strips featuring a magnifying component the display screen magnifying device 10 allows cellular telephone users to view their display screens 13 with expedience and ease in just a matter of seconds. In the manner, users would be able to avoid the hassle of trying to find their glasses or waste pressure minutes trying to discern the display information which can result in missing a very important phone call, for example. By using the display screen magnifying device 10, consumers need only glance through the applied seamless strip 12A to see words and numbers expanded up to six times their normal size. As a result, some users could conceivably leave their reading glasses behind when needing to answer the phone. Even those with 20/20 vision would appreciate the benefits of the display screen magnifying device 10 as this versatile product facilitates and even more effortless phone usage. The display screen magnifying device 10 can also be incorporated for use with other items such as watch faces and fuel gauges (not shown).

It will thus be seen that a new and novel magnifying display screen device has been illustrated and described and it will be apparent to those skilled in the art that various changes and modifications may be made thereto without departing from the spirit of the invention.

I claim:

1. A configurable apparatus for magnifying an information display screen of an electronic device comprises, a flexible sheet of transparent magnification material of a known dimension greater than that of said display screen, said magnification material of a synthetic resin composition having at least one finished planar engagement surface imparting an electrostatic attraction to an engaged co-planar surface of said display, said transparent magnification material is infused with aspheric lensing with a protective coating, selective size determination of said flexible sheet corresponding to said known dimension of said display screen by cutting said flexible sheet.

2. The configurable apparatus for magnifying an information display screen of on electronic device set forth in claim 1 wherein said electronic device is a cellular phone.

* * * * *